March 1, 1927. 1,619,714
W. L. FRY
BRAKE TESTING DEVICE
Filed Sept. 23, 1925
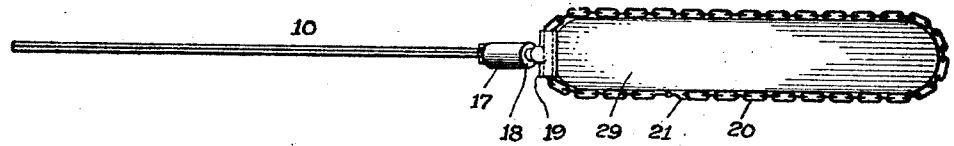
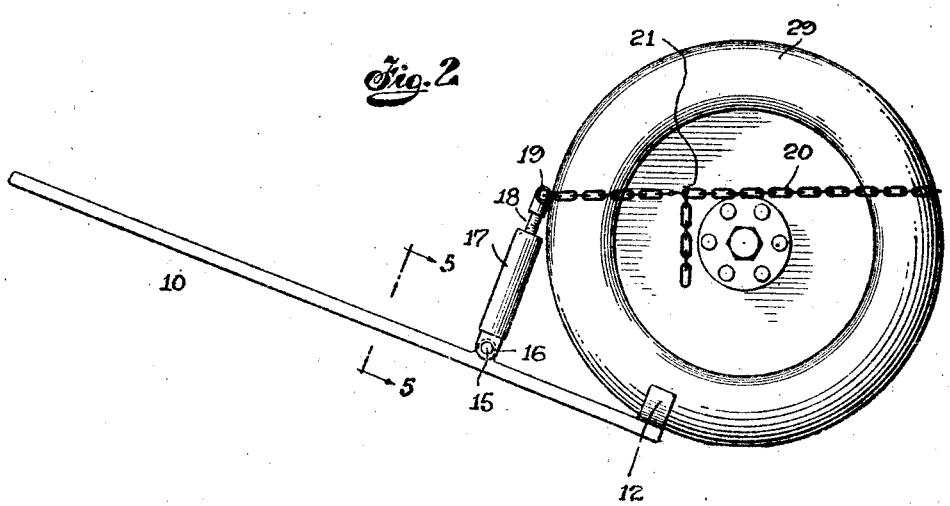
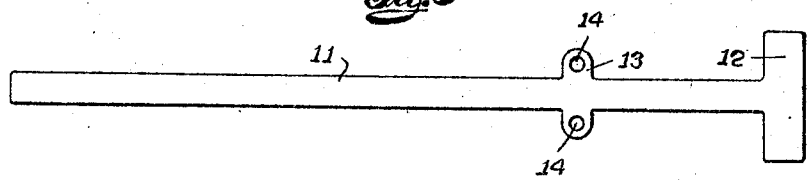
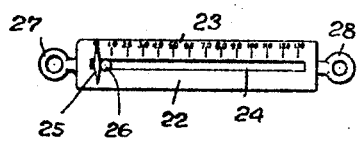
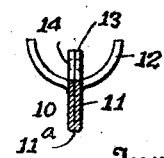
Inventor,
Walter L. Fry
By his Attorney,
Ramsay Hoguet.

Patented Mar. 1, 1927.

1,619,714

UNITED STATES PATENT OFFICE.

WALTER L. FRY, OF NEW YORK, N. Y.

BRAKE-TESTING DEVICE.

Application filed September 23, 1925. Serial No. 58,091.

My invention relates to improvements in brake testing devices and is peculiarly adapted for use in connection with automobile brakes of a similar general character. It is well understood that for reasons of safety and efficiency it is desirable and, in fact, necessary, to have automobile brakes operate coinstantaneously on the various wheels and with substantially uniform pressure. In fact the pressure of the brakes on the rear wheels should be identical and should have a fixed relation to the pressures of the brakes on the forward wheels. Apparatus for testing such brakes has heretofore been of such an elaborate and unsatisfactory nature that attempts have frequently been made to adjust the brakes without any definite determining test.

My invention is intended to produce an extremely simple, inexpensive and efficient device which can be easily applied to a wheel and which when operated will indicate the pressure required to move a wheel against a set brake, and by applying the device to different wheels it will be seen that the brakes may be adjusted so that the same pressure required to move a wheel against its brake can also be determined on another wheel.

My invention is intended to produce a device of extreme simplicity and strength as above stated, and also to produce a structure which cannot only be instantly applied, but which will grip the wheel without slipping and enable a pressure to be exerted to turn the wheel which will easily overcome the set brake and which will be better understood from the following description.

Reference may be had to the accompanying drawings forming a part of this specification, in which similar reference characters indicate corresponding parts in all the views.

Figure 1 is a plan view of my device as applied to a wheel, the latter being shown diagrammatically;

Figure 2 is a side elevation of the structure shown in Figure 1;

Figure 3 is a plan of a development of the main lever blank;

Figure 4 is a detail of a recording element which can be used in connection with the device; and Figure 5 is a cross section on the line 5—5 of Figure 2.

In carrying out my invention I employ a single simple lever 10 which can best be formed from a blank 11, the latter having at one end a laterally extending portion 12 which may or may not be integral with the blank 11, and it can be curved as shown in Figure 5 so as to form a shoe fitting against the tire of the wheel 29 as illustrated in Figure 2. The blank 11 also has laterally extending lugs 13 which are perforated similarly as at 14, and when the lever is formed the blank 11 is folded centrally and longitudinally in the center so that the lugs 13 come together and after the blank is centrally bent as shown at 11ª in Figure 5 the opposed sides of the blank form a single lever element which makes the latter very strong as well as cheap and light.

The perforations 14 coincide when the blank 11 is bent or doubled as aforesaid, and these perforations serve to receive the pivot 15 of the lug 16 on one end of a cylinder 17 which carries a piston rod 18 having a piston at its lower end working within the cylinder 17, which piston acts against an internal spring. The piston rod 18 is graduated as shown in Figure 2 to indicate in pounds the pressure required to pull out the piston rod and piston against the tension of its spring. This structure is not shown in detail because it is a cylinder spring scale to all intents, and the other end of the piston rod is provided with an eye 19 through which is extended a flexible element adapted to be looped over the wheel. This element can best be a chain 20 having a hook 21 by which the length of the loop formed by the chain can be adjusted.

Instead of the cylinder scale referred to the type shown in Figure 4 can be used in which the member 22 is the ordinary well known hollow member having graduations 23 on the face and slotted longitudinally as at 24 so that the indicator 25 and stud 26 slide in the slot. The body of the scale has an eye 27 at one end which can connect with the pivot 15 as aforesaid while the spring-pressed indicator 25 and stud 26 connect with a second eye 28 which can be connected with the chain 20 as already described. This scale is not shown in detail because both types of scale referred to are of common construction and any spring-pressed indicator acting like a scale can be substituted for either of the elements shown.

When the structure is to be used the brake of a wheel as 29 is set, the wheel raised from the floor upon a jack or otherwise, and the lever 10 placed against the wheel with the shoe 12 grasping the periphery thereof. The element 20 is looped over the wheel so as to frictionally grip the same extending transversely across it a little off the diameter, and then the lever 10 is moved in a direction to draw on the element 20 and turn the wheel. As the lever is fulcrumed on the wheel peripherally and with the element 20 connected as described a great leverage can be applied and the wheel can be easily turned to move it against the set brake. When this is done the scale either as shown in Figures 2 or 4 will indicate the pressure exerted to start the wheel against the brake tension. A record is made of the pounds pressure and the device is then applied to the opposite wheel in the same way, and it will be readily understood that in this way the tension of the brakes can be readily determined and they may be adjusted for uniformity.

It will be noted that the device which I have described is exceedingly simple, very easy of application, inexpensive and powerful.

What I claim is:

1. A brake testing device comprising a lever adapted to fulcrum against the periphery of a wheel, a flexible and adjustable element adapted to loop over a portion of the wheel, and tension indicating means connecting the said element with the lever.

2. A brake testing device comprising a lever formed of a blank folded longitudinally and provided with lugs, and a wheel engaging shoe, a tension testing device pivoted to the aforesaid lugs, and a flexible member adapted to engage the periphery of a wheel and having a connection with the tension testing device.

In testimony whereof, I have signed my name to this specification this 21st day of September, 1925.

WALTER L. FRY.